United States Patent
Jahnke et al.

(10) Patent No.: US 12,265,016 B2
(45) Date of Patent: Apr. 1, 2025

(54) FLUORESCENT MATERIAL AS A RADIATION SOURCE IN AN APPARATUS FOR ARTIFICIAL WEATHERING

(71) Applicant: ATLAS Material Testing Technology GmbH, Linsengericht-Altenhaßlau (DE)

(72) Inventors: Jörn Jahnke, Linsengericht-Altenhaßlau (DE); Bernd Rudolph, Alzenau (DE); Tom Marchese, Mt Prospect, IL (US)

(73) Assignee: ATLAS Material Testing Technology GmbH, Linsengericht-Altenhasslau (DE)

( * ) Notice: Subject to any disclaimer, the term of this patent is extended or adjusted under 35 U.S.C. 154(b) by 401 days.

(21) Appl. No.: 17/540,162

(22) Filed: Dec. 1, 2021

(65) Prior Publication Data
US 2022/0228970 A1  Jul. 21, 2022

(30) Foreign Application Priority Data
Jan. 19, 2021 (EP) ..................... 21152379

(51) Int. Cl.
*G01N 17/00* (2006.01)
*G01N 1/44* (2006.01)

(52) U.S. Cl.
CPC ............. *G01N 17/004* (2013.01); *G01N 1/44* (2013.01)

(58) Field of Classification Search
CPC ....... G01N 17/004; G01N 1/44; G01N 17/002
See application file for complete search history.

(56) References Cited

U.S. PATENT DOCUMENTS

| | | | |
|---|---|---|---|
| 4,703,224 A | 10/1987 | Rattray et al. | |
| 9,528,927 B2* | 12/2016 | Rudolph | G01N 17/002 |
| 2004/0178367 A1* | 9/2004 | Fischer, Jr. | G02B 5/226 |
| | | | 250/504 R |
| 2005/0087768 A1* | 4/2005 | March | G01N 17/004 |
| | | | 257/200 |
| 2005/0092114 A1* | 5/2005 | Schonlein | G01N 17/00 |
| | | | 73/866 |
| 2006/0139931 A1 | 6/2006 | March et al. | |
| 2013/0324722 A1* | 12/2013 | Chung | H01L 33/502 |
| | | | 544/231 |

(Continued)

FOREIGN PATENT DOCUMENTS

| CN | 210866175 U | * | 6/2020 |
|---|---|---|---|
| JP | S6217904 A | | 1/1987 |

(Continued)

OTHER PUBLICATIONS

Introduction to Solar Simulators, AZO Materials (Apr. 7, 2014), https://www.azom.com/article.aspx?ArticleID=10817 (Year: 2014).*

(Continued)

*Primary Examiner* — David E Smith
(74) *Attorney, Agent, or Firm* — Cooper Legal Group, LLC

(57) ABSTRACT

An apparatus for artificial weathering or lightfastness testing of samples or for simulating solar radiation, the apparatus comprising a weathering chamber, a UV light source provided in the weathering chamber, and a fluorescent material arranged to be radiated by a UV radiation emitted by the UV light source, the fluorescent material being configured to emit a fluorescent radiation comprising spectral emission characteristics similar to natural solar radiation.

11 Claims, 5 Drawing Sheets

(56) References Cited

U.S. PATENT DOCUMENTS

| | | |
|---|---|---|
| 2014/0008690 A1 | 1/2014 | Funayama et al. |
| 2015/0270449 A1 | 9/2015 | Park et al. |
| 2018/0212118 A1* | 7/2018 | Chen ................... H01L 33/56 |

FOREIGN PATENT DOCUMENTS

| | | | |
|---|---|---|---|
| JP | H06243841 A | | 9/1994 |
| JP | H09099106 A | | 4/1997 |
| JP | H10104151 A | | 4/1998 |
| JP | 2010078607 A | | 4/2010 |
| JP | 2013218793 A | | 10/2013 |
| JP | 2015025752 A | | 2/2015 |
| JP | 2015060921 A | * | 3/2015 |
| JP | 5708128 B2 | | 4/2015 |
| JP | 3203769 U | | 4/2016 |
| JP | 2017527957 A | * | 9/2017 |
| JP | 2019114666 A | * | 7/2019 |

OTHER PUBLICATIONS

Introduction to Solar Simulators, AZOM Materials, https://www.azom.com/articl.aspx?ArticleID=10817 (Year: 2014).*

Introduction to Solar Simulators, AZOM Materials, https://www.azom.com/artil.aspx?ArticleID=10817 (Year: 2014).*

Shima, Hiroshi, "Plastics-Methods of exposure to laboratory light sources -Part 2: Xenon-arc lamps", Revised on Nov. 20, 2008, 10 pages.

European Search Report cited in EP21152379 mailed Jun. 23, 2021, 7 pages.

EP Examination Report cited in EP21152379.0, mailed Jul. 26, 2024, 4 pages.

* cited by examiner

FLUORESCENT MATERIAL AS A RADIATION SOURCE IN AN APPARATUS FOR ARTIFICIAL WEATHERING

RELATED APPLICATIONS

The present disclosure claims priority to European Patent Application 21152379.0, filed on Jan. 19, 2021, which is incorporated herein by reference.

TECHNICAL FIELD

The present disclosure relates to an apparatus for artificial weathering, an apparatus for lightfastness testing, or a sun light simulator apparatus, such apparatus comprising as a light source a UV light source provided in the weathering chamber and a fluorescent material arranged to be radiated by a UV radiation emitted by the UV light source.

BACKGROUND

Artificial weathering or sunlight simulator apparatuses are intended to estimate the lifetime of materials which are constantly exposed to natural weather conditions during their use, and which therefore suffer from climatic effects such as sunlight, solar heat, moisture and the like. In order to obtain a good simulation of the natural weathering situation, the spectral energy distribution of the light generated in the device should correspond as closely as possible to that of natural solar radiation, for which reason xenon radiators are used as radiation sources in such devices. An accelerated ageing test of the materials is essentially achieved by much more intense irradiation of the samples compared with natural conditions, which speeds up the ageing of the samples. In this way, a prediction of the long-term ageing of a material sample can be made after a comparatively short time.

A large number of the samples studied in artificial weathering devices consist of polymeric materials. Their deterioration due to weathering is essentially caused by the UV component of solar radiation. The primary photochemical processes which take place during this, that is to say the absorption of photons and the generation of excited states or free radicals, are independent of temperature. The subsequent reaction steps with the polymers or additives, however, may be temperature-dependent so that the observed ageing of the materials is also temperature-dependent.

A xenon lamp is normally used as the radiation source in the weathering testers of the prior art. Although such a lamp is known to be able to simulate the solar spectrum very well, the emitted radiation nevertheless has a relatively high spectral component in the infrared spectral range, which needs to be suppressed by filters in order to prevent excessive heating of the samples. Furthermore, a commercially available xenon radiation source only has a lifetime of about 1500 hours.

A halogen lamp may also be used as the radiation source, although this has the disadvantage that it is not adjustable, or can only be adjusted to a minor extent. The same applies to fluorescent lamps, which likewise have already been used as radiation sources in weathering testers and which also have the disadvantage of a relatively short lifetime.

For these and other reasons there is a need for the present disclosure.

SUMMARY

An aspect of the present disclosure relates to an apparatus for artificial weathering or lightfastness testing of samples or for simulating solar radiation, the apparatus comprising a weathering chamber, a UV light source provided in the weathering chamber, and a fluorescent material arranged to be radiated by a UV radiation emitted by the UV light source, the fluorescent material being configured to emit a fluorescent radiation comprising spectral emission characteristics similar to natural solar radiation.

BRIEF DESCRIPTION OF THE DRAWINGS

The accompanying drawings are included to provide a further understanding of aspects and are incorporated in and constitute a part of this specification. The drawings illustrate aspects and together with the description serve to explain principles of aspects. Other aspects and many of the intended advantages of aspects will be readily appreciated as they become better understood by reference to the following detailed description. The elements of the drawings are not necessarily to scale relative to each other. Like reference signs may designate corresponding similar parts.

The present disclosure will be explained in more detail below with reference to exemplary embodiments in conjunction with the figures of the drawing, in which.

DETAILED DESCRIPTION OF THE DRAWINGS

The accompanying drawings are included to provide a further understanding of aspects and are incorporated in and constitute a part of this specification. The drawings illustrate aspects and together with the description serve to explain principles of aspects. Other aspects and many of the intended advantages of aspects will be readily appreciated as they become better understood by reference to the following detailed description. The elements of the drawings are not necessarily to scale relative to each other. Like reference signs may designate corresponding similar parts.

In the following detailed description, reference is made to the accompanying drawings, in which are shown by way of illustration specific aspects in which the disclosure may be practiced. In this regard, directional terminology, such as "top", "bottom", "front", "back", etc. may be used with reference to the orientation of the figures being described.

Since components of described devices may be positioned in a number of different orientations, the directional terminology may be used for purposes of illustration and is in no way limiting. Other aspects may be utilized and structural or logical changes may be made without departing from the concept of the present disclosure. Hence, the following detailed description is not to be taken in a limiting sense, and the concept of the present disclosure is defined by the appended claims.

In addition, while a particular feature or aspect of an example may be disclosed with respect to only one of several implementations, such feature or aspect may be combined with one or more other features or aspects of the other implementations as may be desired and advantageous for any given or particular application. Furthermore, to the extent that the terms "include", "have", "with" or other variants thereof are used in either the detailed description or the claims, such terms are intended to be inclusive in a manner similar to the term "comprise". The terms "coupled" and "connected", along with derivatives may be used. It should be understood that these terms may be used to indicate that two elements or layers co-operate or interact with each other regardless whether they are in direct physical or electrical contact, or they are not in direct contact with each other which means that there can be one or more intermediate elements disposed between them. Also, the term "exemplary" is merely meant as an example, rather than the best or optimal. The following detailed description, therefore, is not to be taken in a limiting sense, and the scope of the present disclosure is defined by the appended claims.

Figure 1A:
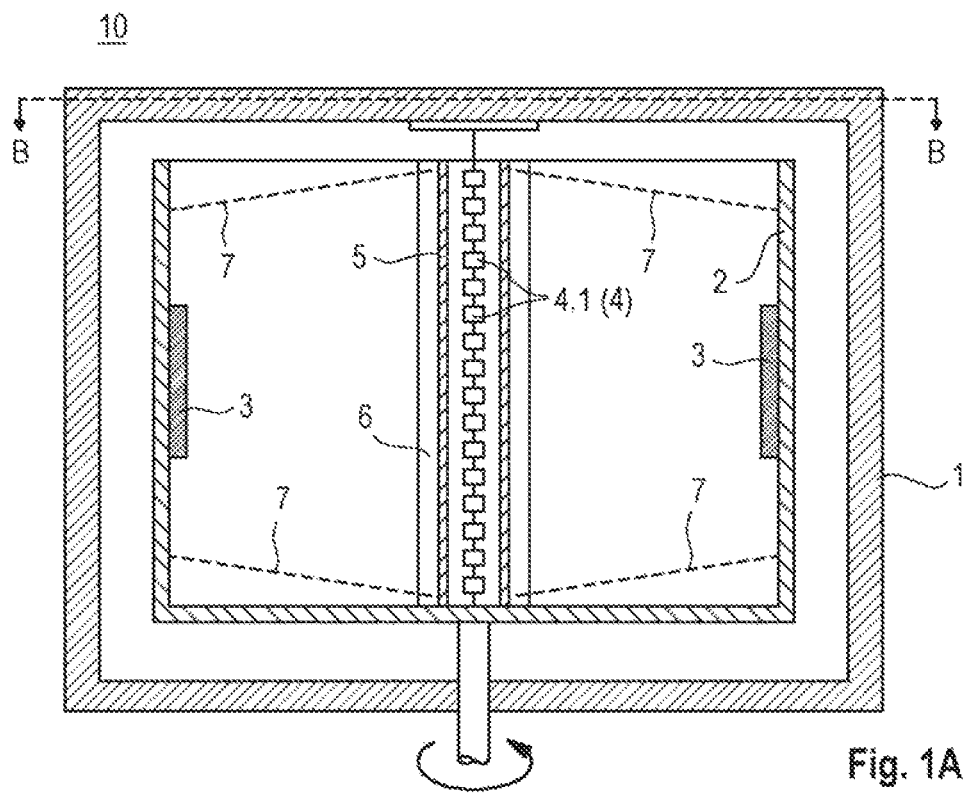
FIG. 1 comprises FIGS. 1A and 1B and shows a vertical cross-sectional view (A) and a horizontal cross-sectional down view taken at line B-B of FIG. 1A (B) of an example of an apparatus for artificial weathering, the apparatus being of the dynamic type with rotating samples, and the UV light source comprising a chain of UV light emitting diodes (LEDs).
Figure 1B:
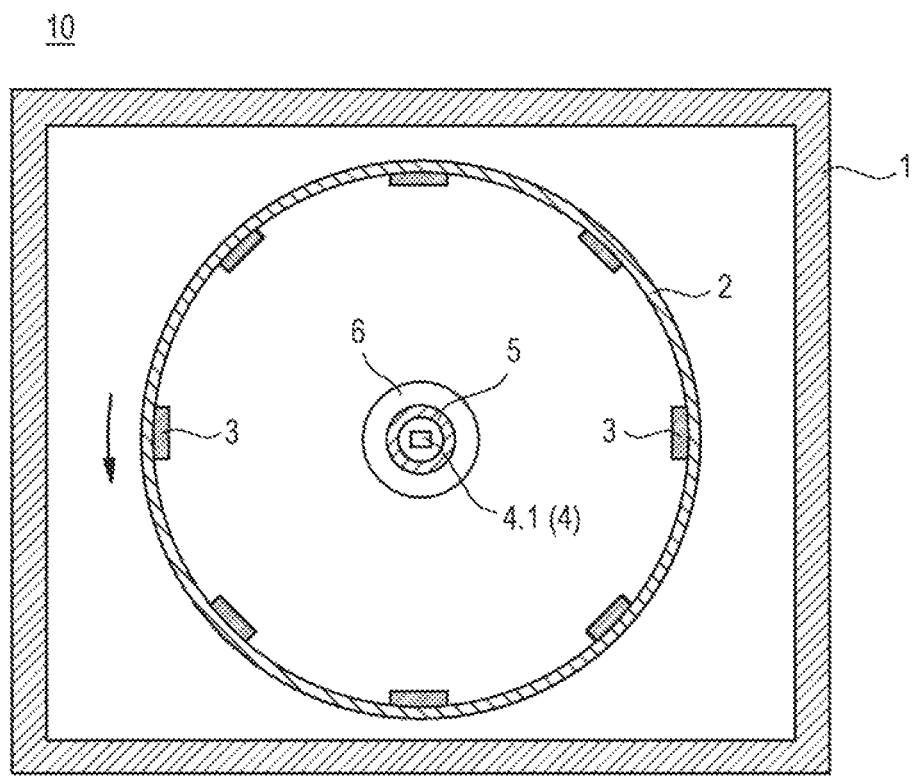

FIG. 1 comprises FIGS. 1A and 1B and shows an apparatus according to the present disclosure for the artificial weathering of samples.

The apparatus 10 of FIG. 1 comprises a weathering chamber 1 and a holding frame 2 which is mounted so that it can rotate in the weathering chamber 1. The holding frame 2 comprises a closed ring shape and samples 3 or workpieces can be held on appropriate holding platforms or sockets provided on the holding frame 2. The holding frame 2 can have, in particular, a cylindrical form and a circular lateral cross section as can be seen in FIG. 1B.

The apparatus 10 of FIG. 1 further comprises a UV light source 4 in the form of a plurality of UV light emitting diodes (UV-LEDs) 4.1 provided in the weathering chamber 1 and a fluorescent material 5 arranged to be radiated by a UV radiation emitted by the UV-LEDs 4.1. The fluorescent material 5 is configured to emit a fluorescent radiation 7 comprising spectral emission characteristics similar to natural solar radiation.

In the example of an apparatus 10 as shown in FIG. 1, the UV light source 4 comprises a chain of UV light emitting diodes (UV-LEDs) 4.1 which may be electrically connected in series. The UV-LEDs 4.1 may each comprise a maximum emission wavelength of less than 300 nm.

The fluorescent material 5 may comprise a solid aggregate state and in particular be in the form of a thin layer applied to a transparent layer 6, in particular a glass or quartz layer 6. In the example shown in FIG. 1 the transparent layer 6 has the form of a cylinder and the layer of fluorescent material is applied to an inner wall of the cylinder. The layer of fluorescent material can also be applied to the outer wall of the cylinder in which case, however, it would be exposed to the atmosphere prevailing within the weathering chamber.

According to an embodiment, the UV-LEDs 4.1 are arranged on a central symmetry axis of the cylindrical transparent layer 6 so that each location of the fluorescent material layer 5 layer is equally spaced from the UV LEDs 4.1. The central symmetry axis of the cylindrical transparent layer 6 and the fluorescent material layer 5 may at the same time fall together with the rotation axis of the holding frame 2 so that each one of the samples 3 is equally spaced from the fluorescent material layer 5.

As to the composition of the fluorescent material, it may comprise two or more fluorescent components configured to emit fluorescent radiation with different spectral emission characteristics such that a superposition of the different spectral emission characteristics approximates the solar light spectrum in the best possible way.

Figure 5:
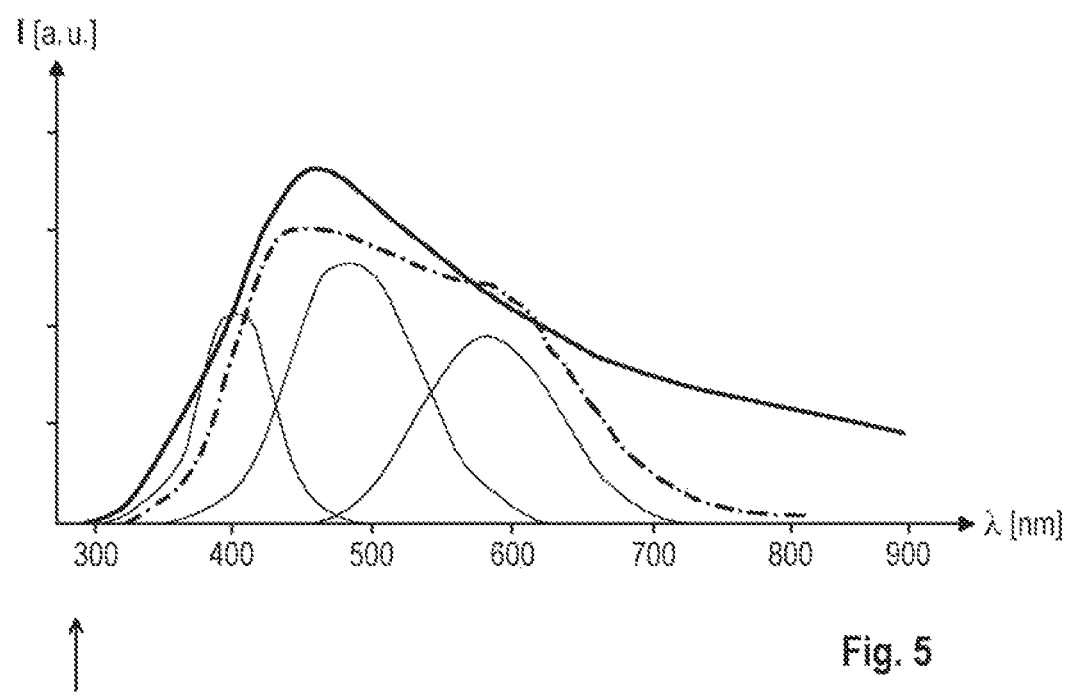
FIG. 5 illustrates an example of a simulation of the solar spectrum by superposition of three fluorescent emission curves.

FIG. 5 shows a wavelength-intensity diagram for illustrating the simulation of the solar spectrum.

The wavelength-intensity diagram of FIG. 5 shows the simplified solar spectrum here as a dark solid line. During the weathering test or lightfastness test this profile is simulated by means of, for example, three different fluorescent materials having different emission spectra, depicted here as light solid lines. The fluorescent materials are excited by a UV source emitting UV radiation at a wavelength below 300 nm symbolized by an arrow. The UV radiation can be quasi-monochromatic like that of a UV-LED. The spectra of the three fluorescent materials are illustrated as light solid lines, while the superimposed emission spectrum is shown as a dash-dotted line. In order to achieve a good approximation of the solar spectrum, the fluorescent emission spectra comprise different radiation intensities. This can be achieved by providing different amounts of fluorescent material of the different fluorescent components.

The different fluorescent components can be mixed together and deposited onto the transparent layer as a solid homogenous layer. According to another possibility a layer stack of individual layers can be deposited onto the transparent layer wherein each layer of the layer stack is made of one of the fluorescent components.

At least in principle the fluorescent material can also be provided in a liquid or gaseous aggregate state wherein the fluorescent liquid or gas maybe confined in an intermediate space between transparent glass or quartz walls.

The components of the fluorescent material may be comprised of any kind of commercially available dyes, in particular one or more of allophycocyanin, Berber, Brilliant sulfa Flavin, quinine, coumarins, e.g. 4-methylumbelliferone, DAPI, 1,3,2-dioxaborines (complexes of boric acid derivatives with 1,3-dicarbonyl compounds), Epicoccoon, Fluoresceins (e.g. 5-octadecanoylaminofluorescein, 6-carboxy-4',5'-dichloro-2',7'-dimethoxyfluorescein-N-succinimidylester), Fluorescent proteins (GFP, YFP, RFP), IAE-DANS, Indocyanine green, Sodium diuranate, Nile blue/ Nile red, Porphyrins (heme, chlorophylls etc.), Quadraines (square acid dyes) based on N,N-dialkylanilines, Rhodamine, Style Avenue, Synthetic fluorescent labels or markers, Alexa-Fluor (Molecular Probes, Invitrogen Corp.) and Cyanine (Cy3, Cy5 etc.), TMRM+.

Furthermore the transparent layer 6 can also have a filter function in order to further optimize the spectrum or to further approximate the spectrum to the solar spectrum. The transparent layer 6 could, for example, have on one of its main surfaces a layer configured to filter excessive infrared light emitted by the fluorescent material.

In a manner which is known per se, the weathering chamber 1 may also have other artificial weathering instruments, for example moisture generators or the like, although these do not play an essential part in the present disclosure and will not therefore be discussed in detail. For example, an air flow may also be blown into the weathering chamber 1 and sweep past the samples 3 in a vertical direction.

Figure 2:
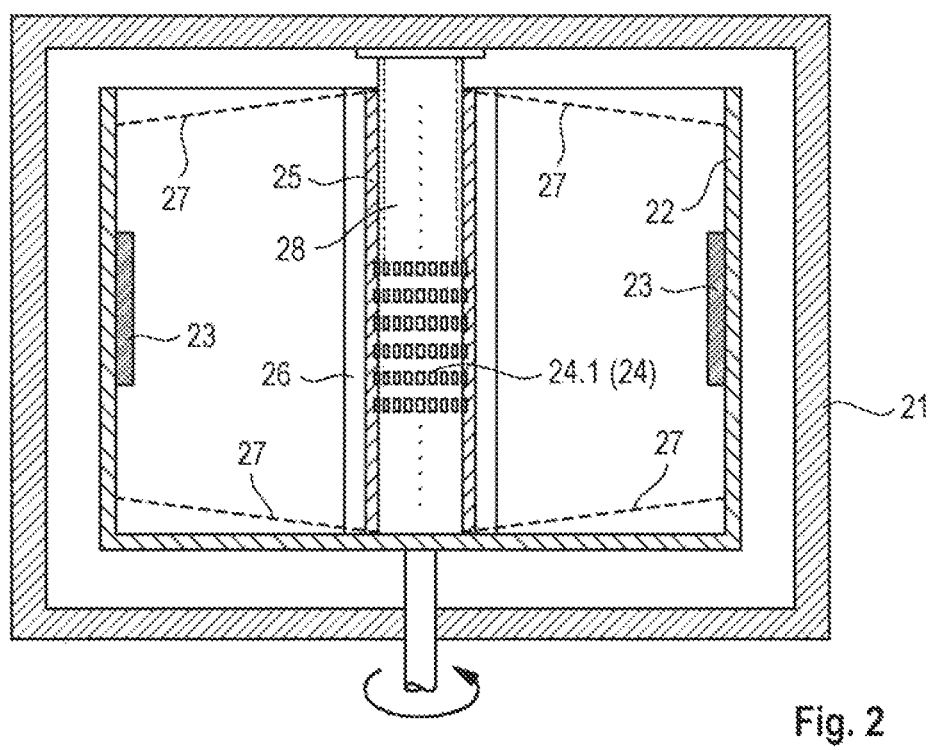
FIG. 2 shows a vertical cross-sectional view of an example of an apparatus for artificial weathering, the apparatus being of the dynamic type with rotating samples, and the UV light source comprising a central column and a plurality of UV LEDs arranged on an outer cylindrical surface of the central column.

FIG. 2 shows a vertical cross-sectional view of an example of an apparatus for artificial weathering.

The apparatus 20 of FIG. 2 comprises a similar structure as the apparatus of FIG. 1 and comprises a weathering chamber 21 and a holding frame 22 which is mounted so that it can rotate in the weathering chamber 21. The holding frame 22 comprises a closed ring shape and samples 23 or work-pieces can be held on appropriate holding platforms or sockets provided on the holding frame 22. The holding frame 22 can have, in particular, a cylindrical form and a circular lateral cross section as was already depicted in FIG. 1B.

The apparatus 20 of FIG. 2 further comprises a UV light source 24 in the form of a plurality of UV-LEDS 24.1 provided in the weathering chamber 21 and a fluorescent material 25 arranged to be radiated by a UV radiation emitted by the UV-LEDs 24.1. The fluorescent material 25 is configured to emit a fluorescent radiation 27 comprising spectral emission characteristics similar to natural solar radiation.

In the example of an apparatus 20 as shown in FIG. 2, the apparatus 20 further comprises a central column 28, wherein the UV-LEDs 24.1 are attached to the central column 28 and emit the UV radiation in a radial direction onto the fluorescent material 25. The UV-LEDs 24.1 could, for example, be mounted onto a flexible printed circuit board (PCB) which can be attached to the outer wall of the central column 28. The UV-LEDs 24.1 may each comprise a maximum emission wavelength of less than 300 nm.

The apparatus 20 may comprise further features similar to the ones which have already been explained in connection with the apparatus 10 of FIG. 1. For, example, the apparatus 20 of FIG. 2 further comprises a cylindrical transparent layer 26 of glass or quartz, wherein transparent layer 26 is attached to and surrounds the central column 28 and wherein the fluorescent material 25 is applied to an inner wall of the transparent layer 26 and is thus in direct contact with the outer wall of the central column 28 and the UV-LEDs 24.1. Otherwise there can also be a space between the UV-LEDs 24.1 and the fluorescent material layer 25.

The central column 28 may comprise a circular cross-section and a central symmetry axis of the central column 28 may fall together with a central symmetry axis of the cylindrical layer 26 and the fluorescent material layer 25 so that in case of a space between the UV-LEDs 24.1 and the fluorescent material layer 25, each location of the fluorescent material layer 25 is equally spaced from the UV LEDs 24.1. Moreover, the central symmetry axis of the fluorescent material layer 25 and the cylindrical transparent layer 26 may at the same time fall together with the rotation axis of the holding frame 22 so that each one of the samples 23 is equally spaced from the fluorescent material layer 25.

Figure 3:
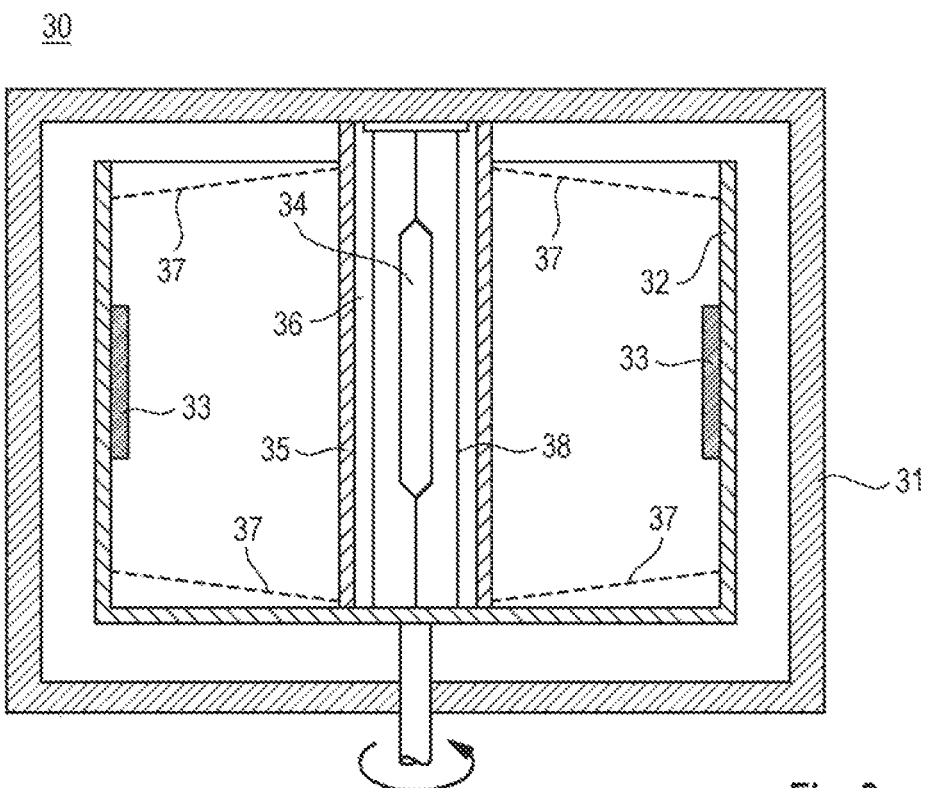
FIG. 3 shows a vertical cross-sectional view of an example of an apparatus for artificial weathering, the apparatus being of the dynamic type with rotating samples, and the UV light source comprising a mercury lamp.

FIG. 3 shows a vertical cross-sectional view of an example of an apparatus for artificial weathering.

The apparatus 30 of FIG. 3 comprises a similar structure as the apparatus of FIG. 1 and comprises a weathering chamber 31 and a holding frame 32 which is mounted so that it can rotate in the weathering chamber 31. The holding frame 32 comprises a closed ring shape and samples 33 or work-pieces can be held on appropriate holding platforms or sockets provided on the holding frame 32. The holding frame 32 can have, in particular, a cylindrical form and a circular lateral cross section as was already depicted in FIG. 1B.

The apparatus 30 of FIG. 3 further comprises a UV light source 34 in the form of a mercury lamp 34, in particular a low-pressure mercury lamp 34, provided in the weathering chamber 31 and a fluorescent material 35 arranged to be radiated by a UV radiation emitted by the mercury lamp 34. The fluorescent material 35 is configured to emit a fluorescent radiation 37 comprising spectral emission characteristics similar to natural solar radiation.

The apparatus 30 may comprise further features similar to the ones which have already been explained in connection with the apparatus 10 of FIG. 1. For example, the apparatus 30 of FIG. 3 further comprises a cylindrical transparent layer 36 of glass or quartz. The apparatus 30 may further comprise a transparent wall 38 surrounding the mercury lamp 34. The transparent layer 36 may be attached to the transparent wall 38. In the example as shown in FIG. 3 the fluorescent material 35 is applied to an outer wall of the transparent layer 36.

The cylindrical wall 38 may comprise a circular cross-section and a central symmetry axis of the wall 38 may fall together with a central symmetry axis of the cylindrical layer 36 and the fluorescent material layer 35 so that each location of the fluorescent material layer 35 is equally spaced from the mercury lamp 34. Moreover, the central symmetry axis of the fluorescent material layer 35 and the cylindrical transparent layer 26 may at the same time fall together with the rotation axis of the holding frame 32 so that each one of the samples 33 is equally spaced from the fluorescent material layer 35.

According to another example, the transparent wall 38 and the transparent layer 36 could also be omitted and the fluorescent material 35 could be applied directly onto the outer wall of the glass bulb of the mercury lamp 34.

Figures 4A, 4B:
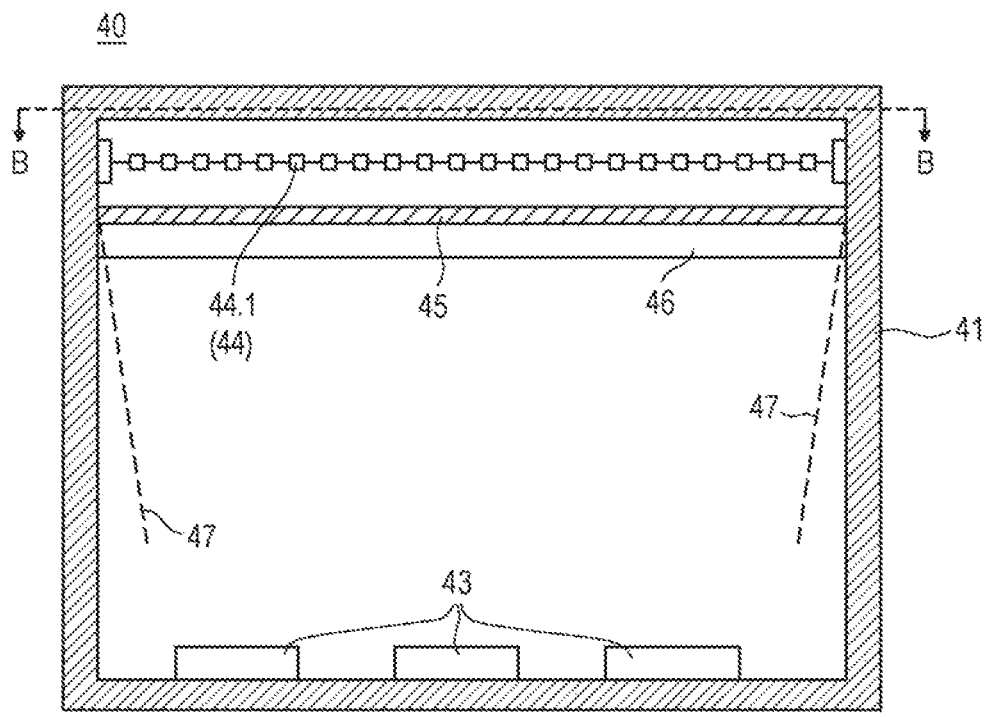
FIG. 4 comprises FIGS. 4A and 4B and shows a vertical cross-sectional view (A) of an example of an apparatus for artificial weathering, the apparatus being of the dynamic type with rotating samples, and the UV light source comprising a chain of UV light emitting diodes (LEDs).

FIG. 4 comprises FIGS. 4A and 4B and shows an example of an artificial weathering device of the static type with fixed samples.

The apparatus 40 for artificial weathering as shown in FIG. 4 comprises a weathering chamber 41 which is configured so that a plurality of samples 43 or work-pieces can be arranged on a bottom surface of the weathering chamber 41. The apparatus 40 of FIG. 4 further comprises three chains 44 of serially connected UV-LEDs 44.1 provided in the weathering chamber 41 and a fluorescent material 45 arranged to be radiated by a UV radiation emitted by the UV-LEDs 441. The fluorescent material 45 is applied to a transparent layer 46, in particular to an upper layer thereof so that it is arranged remote from the inner space of the weathering chamber 41. The fluorescent material 45 is configured to emit a fluorescent radiation 47 comprising spectral emission characteristics similar to natural solar radiation.

The UV-LEDs 44.1 can also be mounted onto a PCB which can be directly attached to the transparent layer 46 with the fluorescent material 45 between them.

The UV light source of the apparatus 40 can also be comprised of mercury lamp as in the example shown in FIG. 3 and the mercury lamp could be arranged above the transparent layer 46 and the fluorescent material layer 45 remote from the samples 3.

The apparatus 40 may comprise further features similar to the ones which have already been explained in connection with the apparatus 10 of FIG. 1.

Although the disclosure has been shown and described with respect to one or more implementations, equivalent alterations and modifications will occur to others skilled in the art based at least in part upon a reading and understanding of this specification and the annexed drawings. The disclosure includes all such modifications and alterations and is limited only by the concept of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application.

The invention claimed is:

1. An apparatus for artificial weathering or lightfastness testing of samples or for simulating solar radiation, the apparatus comprising:
   a weathering chamber;
   an ultraviolet (UV) light source provided in the weathering chamber, the UV light source consisting of a plurality of UV light emitting diodes (LEDs), each one of the plurality of UV LEDs comprising a specific maximum emission wavelength;
   a fluorescent material arranged to be radiated by a UV radiation emitted by the UV light source, the fluorescent material being configured to emit a fluorescent radiation comprising spectral emission characteristics similar to natural solar radiation; and
   a transparent layer, the fluorescent material being applied directly to the transparent layer in the form of a thin layer, wherein:
      a layer configured to filter excessive infrared light emitted by the fluorescent material is directly disposed on one main surface of the transparent layer,
      the transparent layer is in a shape of a cylinder,
      the UV light source is arranged in an inner space of the cylinder, and
      the apparatus is configured to rotate the samples around the fluorescent material.

2. The apparatus according to claim 1, wherein:
   the fluorescent material comprises two or more fluorescent components configured to emit fluorescent radiation with different spectral emission characteristics.

3. The apparatus according to claim 1, further comprising:
   a printed circuit board (PCB), the UV light source comprising the plurality of UV LEDs being mounted on the PCB.

4. The apparatus according to claim 1, wherein:
   the UV radiation comprises at least a spectral component comprising a wavelength below 300 nm.

5. The apparatus according to claim 1, wherein:
   the transparent layer is made of silica glass or quartz glass.

6. The apparatus according to claim 1, wherein:
   the apparatus is configured to arrange the samples in a stationary manner.

7. The apparatus according to claim 1, wherein:
   the plurality of UV light emitting diodes are arranged in a chain at an axial center of the transparent layer.

8. The apparatus according to claim 1, wherein:
   the fluorescent material is arranged as a cylinder having the plurality of UV light emitting diodes disposed at an axial center of the fluorescent material.

9. The apparatus according to claim 1, further comprising:
   a holding frame having a shape of a cylinder.

10. The apparatus according to claim 9, wherein:
    the fluorescent material has the shape of a cylinder, and the holding frame is co-axial with the fluorescent material.

11. The apparatus according to claim 1, wherein:
    the plurality of UV light emitting diodes are arranged at a circumference of a central column,
    the fluorescent material has the shape of a cylinder, and the central column is co-axial with the fluorescent material.

* * * * *